(12) United States Patent
Fujita

(10) Patent No.: US 11,407,348 B2
(45) Date of Patent: Aug. 9, 2022

(54) SEAT STRUCTURE

(71) Applicant: TACHI-S CO., LTD., Tokyo (JP)

(72) Inventor: Daisuke Fujita, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 751 days.

(21) Appl. No.: 16/076,104

(22) PCT Filed: Sep. 16, 2016

(86) PCT No.: PCT/JP2016/077468
§ 371 (c)(1),
(2) Date: Aug. 7, 2018

(87) PCT Pub. No.: WO2017/141476
PCT Pub. Date: Aug. 24, 2017

(65) Prior Publication Data
US 2021/0188144 A1    Jun. 24, 2021

(30) Foreign Application Priority Data

Feb. 16, 2016  (JP) .............................. JP2016-026759

(51) Int. Cl.
*B60N 2/897* (2018.01)
*B60N 2/60* (2006.01)
*B60N 2/68* (2006.01)

(52) U.S. Cl.
CPC .......... *B60N 2/897* (2018.02); *B60N 2/6027* (2013.01); *B60N 2/68* (2013.01)

(58) Field of Classification Search
CPC ............................... B60N 2/897; B60N 2/6027
See application file for complete search history.

(56) References Cited

U.S. PATENT DOCUMENTS

| | | | | |
|---|---|---|---|---|
| 3,233,253 A | * | 2/1966 | Gauvin | A47C 3/12 5/402 |
| 3,586,370 A | * | 6/1971 | Barecki | A47C 31/02 297/228.11 |
| 4,390,209 A | * | 6/1983 | Izuno | B60N 2/809 297/410 |

(Continued)

FOREIGN PATENT DOCUMENTS

| | | | |
|---|---|---|---|
| DE | 202018101145 U1 * | 3/2018 | ............... B60N 2/70 |
| JP | 1982-074835 U | 5/1982 | |

(Continued)

OTHER PUBLICATIONS

International Search Report issued in corresponding International Patent Application No. PCT/JP2016/077468 dated Nov. 1, 2016.

*Primary Examiner* — Timothy J Brindley
(74) *Attorney, Agent, or Firm* — Morgan, Lewis & Bockius LLP

(57) ABSTRACT

A holder is removable from a seatback frame. The seatback frame has a back plate, a top plate extending from an upper portion of the back plate toward a front side, and a fixing plate provided below the top plate and extending from the back plate toward the front side. The top plate has two insertion holes into which two holders can be inserted from above. The fixing plate is configured so as to be able to fix the end portions of the two holders inserted through the insertion holes of the top plate.

3 Claims, 6 Drawing Sheets

(56) References Cited

U.S. PATENT DOCUMENTS

| | | | | |
|---|---|---|---|---|
| 5,195,222 | A * | 3/1993 | Rink | A47C 31/023 24/581.1 |
| 8,733,834 | B2 * | 5/2014 | Palmer | B60N 2/5841 297/218.5 |
| 9,845,032 | B1 * | 12/2017 | Line | B60N 2/5891 |
| 2002/0050729 | A1 * | 5/2002 | Nakano | B60N 2/838 297/216.12 |
| 2008/0001456 | A1 * | 1/2008 | Muller | B60N 2/838 297/354.1 |
| 2012/0280552 | A1 * | 11/2012 | Line | B60N 2/809 297/440.1 |
| 2013/0062918 | A1 * | 3/2013 | Itakura | B60N 2/6027 297/219.1 |
| 2018/0037143 | A1 * | 2/2018 | Line | B60N 2/64 |
| 2018/0236911 | A1 * | 8/2018 | Takeuchi | B60N 2/897 |
| 2020/0079261 | A1 * | 3/2020 | Lossifidis | B60N 2/897 |
| 2020/0079263 | A1 * | 3/2020 | Suarez | B60N 2/829 |

FOREIGN PATENT DOCUMENTS

| | | | | |
|---|---|---|---|---|
| JP | 1982-148356 U | | 9/1982 | |
| JP | H06-312066 A | | 11/1994 | |
| JP | H10-108756 A | | 4/1998 | |
| JP | 2014019201 A | * | 2/2014 | B60N 2/682 |
| JP | 2015-003674 A | | 1/2015 | |
| WO | WO-2018179516 A1 | * | 10/2018 | B60N 2/682 |

* cited by examiner

SEAT STRUCTURE

TECHNICAL FIELD

This application is based on Japanese Patent Application No. JP2016-026759, filed on Feb. 16, 2016, the entire disclosure of which is incorporated herein by reference.

The present invention relates to a seat structure.

BACKGROUND ART

In some vehicle seats, a seatback frame (i.e., the basic structure of a seatback) which is made of a resin, is used in order to achieve, for example, reduction in weight. A seat structure that fixes a headrest to a seatback frame with a bracket is described as an example of a seat structure that employs such seatback frame made of a resin (see Patent Document 1).

CITATION LIST

Patent Document

Patent Document 1: JP2015-003674 A

SUMMARY

Technical Problem

However, the bracket in the above-described seat structure is fixed to the seatback frame with a bonding adhesive, and it is accordingly difficult to replace the bracket when it is broken.

Furthermore, when a headrest stay is inserted into the bracket, the stay in the bracket is exposed on the rear side of the seatback frame. It is accordingly necessary to cover the rear face of the seatback frame with a seat cover for safety purposes. Consequently, the weight of the seat cover increases, leading to an increase in the total weight of the seat.

In addition, there is a demand to ensure sufficient strength of attachment between the headrest and the seatback frame.

The present invention has been made in view of the above circumstances, and it is an object of the present invention to provide a seat structure that is able to solve the above-mentioned problems.

Solution to Problem

The present inventors have found, as a result of intensive studies, that the above-mentioned problems can be solved by: providing a holder that is removable from a seatback frame; configuring the seatback frame to have a back plate, a top plate extending from an upper portion of the back plate toward the front side, and a fixing plate provided below the top plate and extending from the back plate toward the front side; further configuring the top plate to have an insertion hole into which the holder can be inserted from above; and still further configuring the fixing plate to be able to fix an end portion of the holder that is inserted through the insertion hole of the top plate, and have completed the present invention.

That is, the present invention includes the following aspects:

(1) A seat structure enabling a headrest to be fixed to a seatback frame made of a resin via a holder, wherein: the holder is removable from the seatback frame; the seatback frame has a back plate, a top plate extending from an upper portion of the back plate toward a front side, and a fixing plate provided below the top plate and extending from the back plate toward the front side; the top plate has an insertion hole into which the holder can be inserted from above; and the fixing plate is configured so as to be able to fix an end portion of the holder that is inserted through the insertion hole of the top plate.

(2) The seat structure as set out in (1), wherein the seatback frame has side plates extending from right and left sides of the back plate toward the front side.

(3) The seat structure as set out in (2), wherein the fixing plate is formed so as to extend from one of the right and left side plates to the other.

(4) The seat structure as set out in (2) or (3), wherein the top plate and the side plates each have a flange extending toward a back side, and the flange has a groove formed at an inner side of the flange so that an edge of a seat cover is inserted into the groove and fixed therein.

Advantageous Effects of Invention

According to the present invention, the holders can be replaced in a simple manner, the weight of the seat cover can be reduced, which leads to a reduced weight of the seat, and sufficient strength of attachment between the headrest and the seatback frame can be attained.

DESCRIPTION OF EMBODIMENTS

Figure 1:
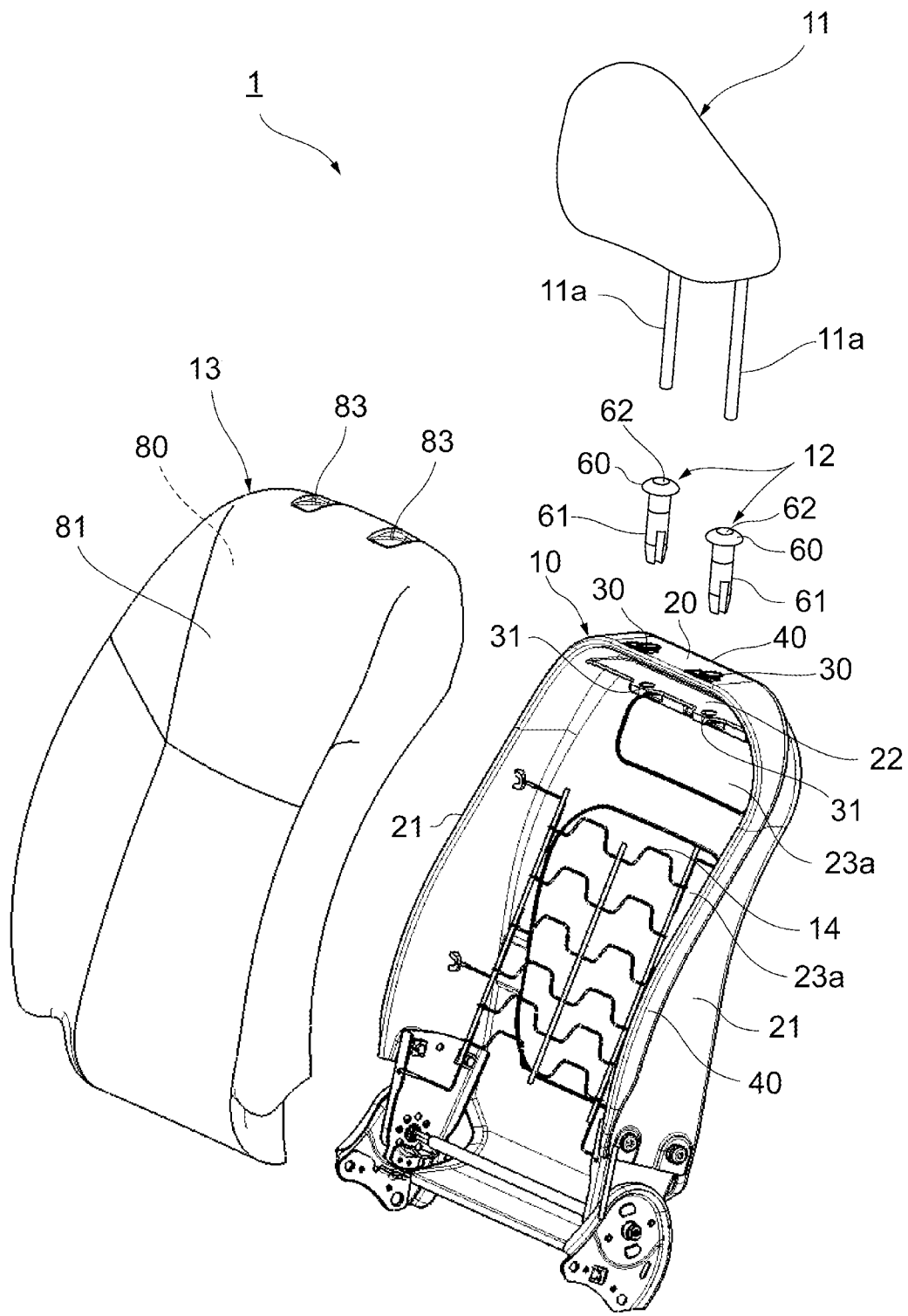
FIG. 1 is an exploded perspective illustration showing an example of the configuration of a seat structure.

Hereinafter, the present invention will be described in more detail. It should be noted that the following embodiments are just examples for describing the present invention and the present invention is not limited to the described embodiments. The same elements will be given the same reference numerals and any repetitive explanation will be omitted. Furthermore, in the drawings, unless otherwise specified, the positional relationships, such as up-and-down and left-and-right relationships, are based on those shown in the drawings. In addition, the dimensional ratios shown in the drawings are not limited to those shown in the drawings.

FIG. 1 is an exploded perspective illustration showing an example of a seat structure 1 according to the present embodiment. The seat structure 1 comprises, for example, a seatback frame (seatback skeleton) 10, a headrest 11, holders 12, a seat cover 13, and a seat cover support 14.

Figure 2:
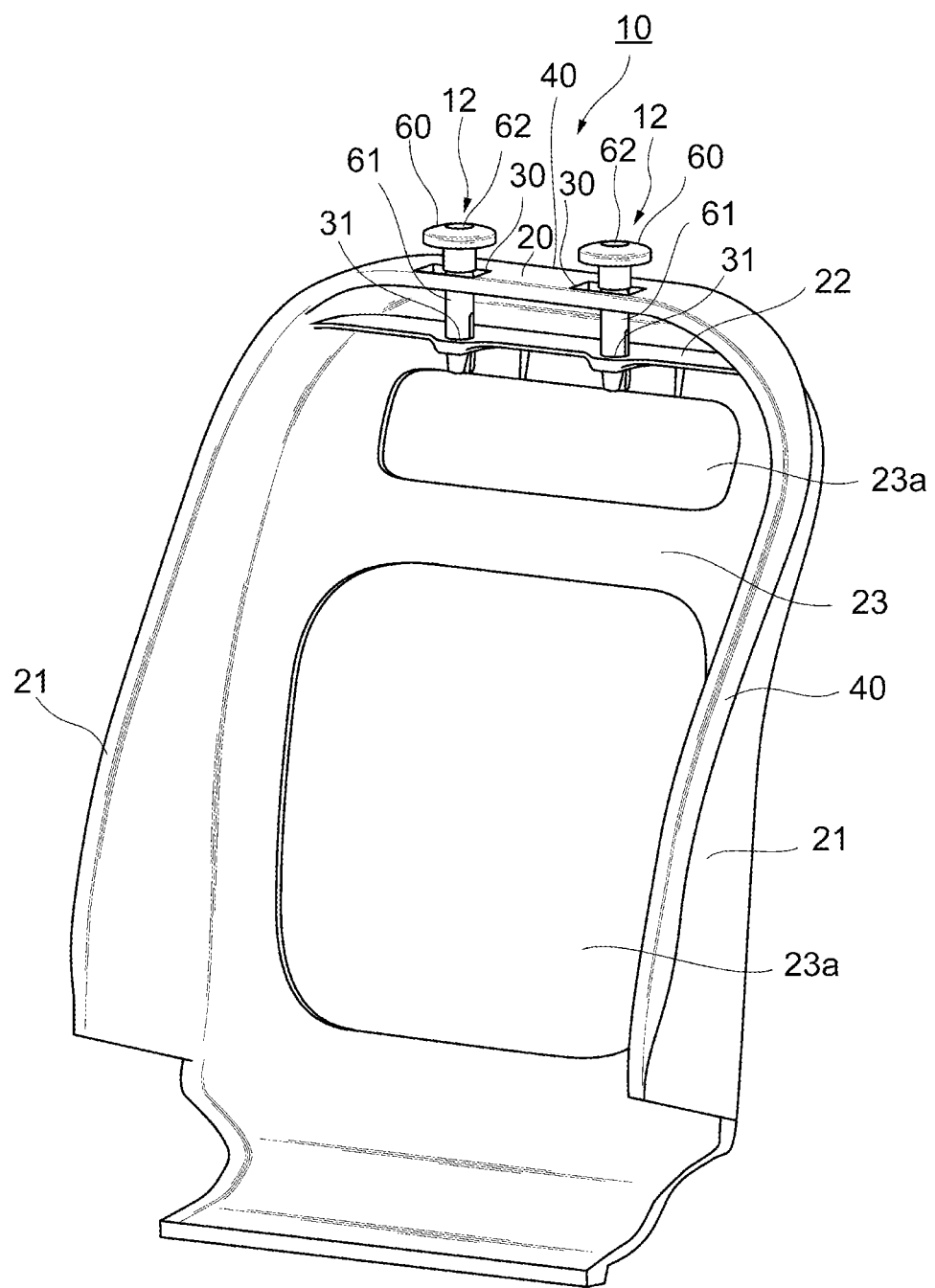
FIG. 2 is a perspective view of a seatback frame when holders are attached to the seatback frame.

The seatback frame 10 serves as, for example, the frame of a seatback (backrest) for a vehicle, and the seatback frame 10 is formed by resin molding. As illustrated in FIG. 2, the seatback frame 10 comprises, for example, a top plate 20, side plates 21, a fixing plate 22 and a back plate 23, and these components are integrally formed with a resin.

The back plate 23 is approximately rectangular. The back plate 23 is located on the back side of the seatback frame 10 and has openings 23a formed at, for example, upper and lower portions thereof.

As illustrated in FIGS. 1-4, the top plate 20 is provided to extend from an upper portion of the back plate 23 toward the front side of the back plate 23. For example, the top plate 20 is arranged horizontally along the right-to-left direction (the width direction) of the seat, and has two insertion holes 30 into which the holders 12 can be inserted from above. The two insertion holes 30 are formed at right and left positions which are at an equal distance from the center of the seat.

Figure 3:
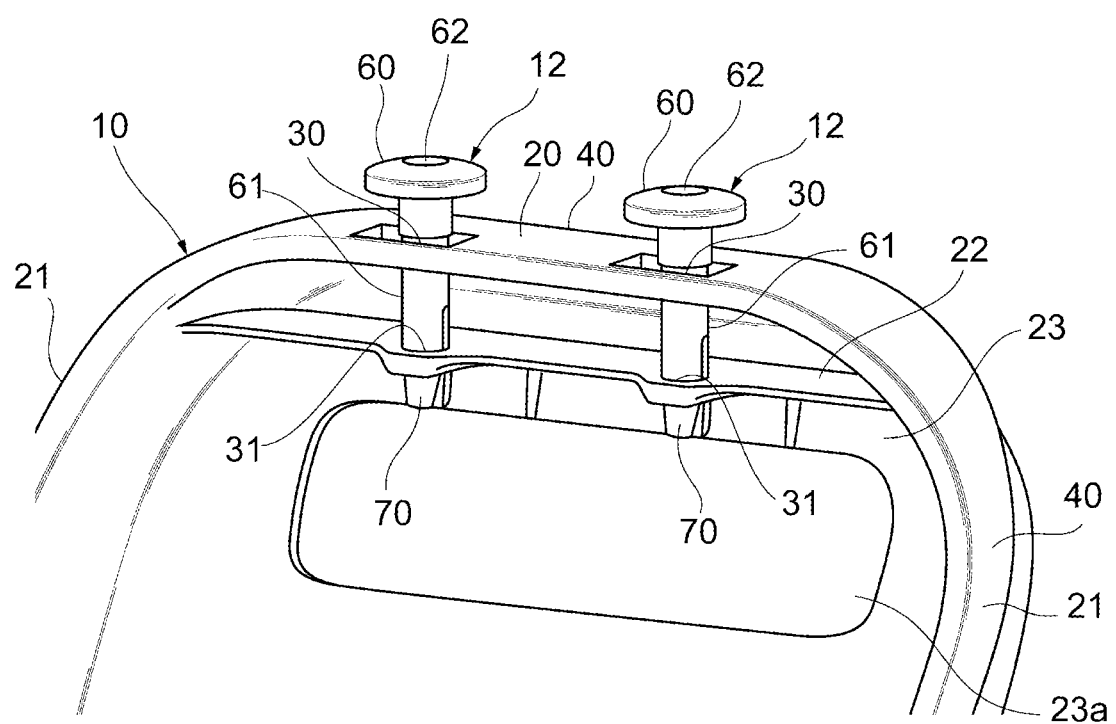
FIG. 3 is an enlarged view of a portion of a seatback frame where holders are attached to the seatback frame.

As illustrated in FIGS. 1-3, the side plates 21 each extend from the right or left side of the back plate 23 toward the front side of the back plate 23. The side plates 21 are continuously connected to the right and left ends of the top plate 20 and are curved from the top plate 20 so as to extend down toward the lower portion of the back plate 23.

The fixing plate 22 has an elongated, approximately rectangular shape and, as shown in FIGS. 1-4, the fixing plate 22 extends from the back plate 23 toward the front side. The fixing plate 22 is arranged below the top plate 20 horizontally so as to be parallel to the top plate 20. Both ends of the fixing plate 22 are respectively connected to the right and left side plates 21, i.e., the fixing plate 22 has a bridging structure. The fixing plate 22 has two fixation holes 31 that allow the respective end portions of the two holders 12, which have been inserted through the insertion holes 30 of the top plate 20, to be fixed in the fixation holes 31.

Figure 4:
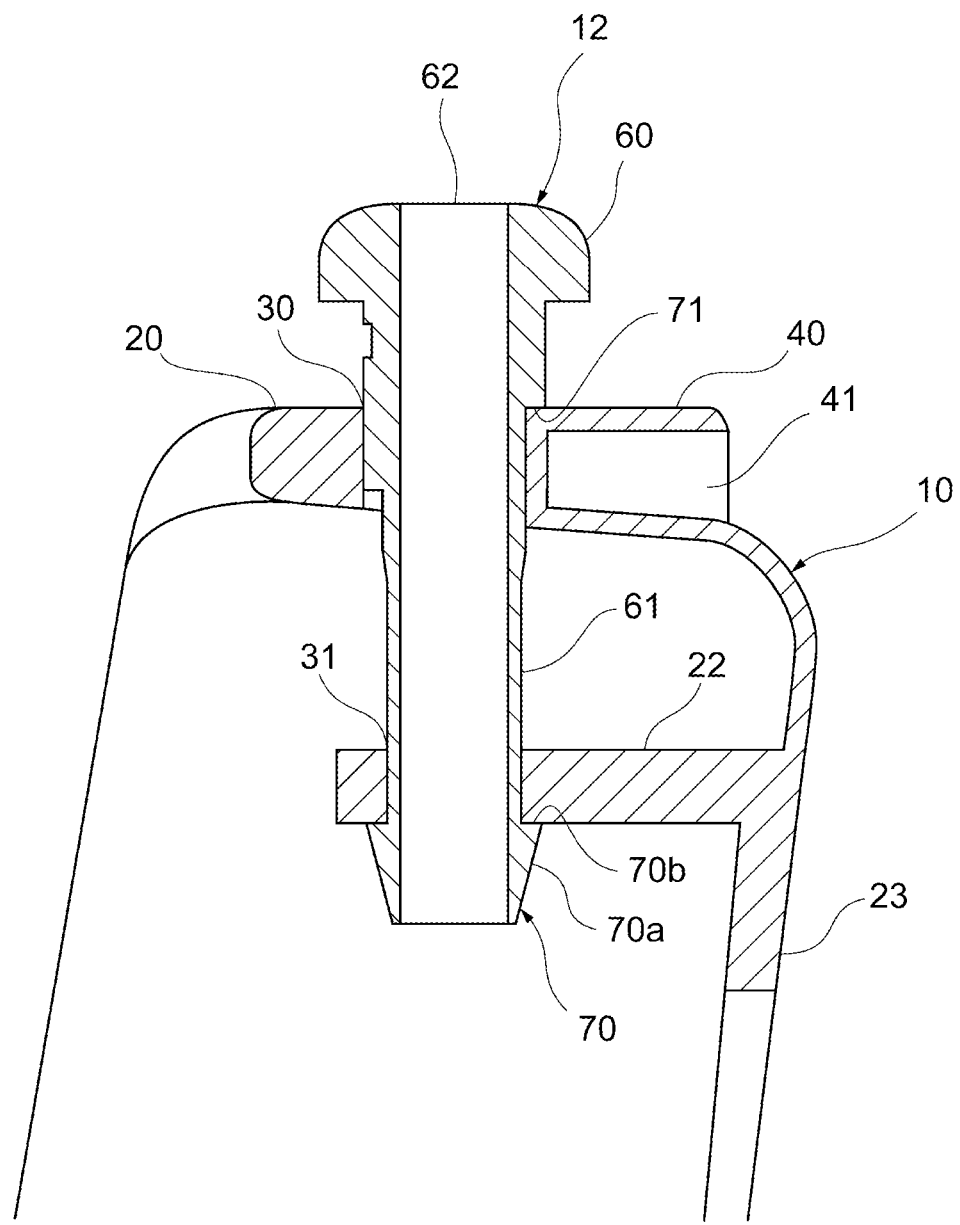
FIG. 4 is an enlarged cross-sectional view of a portion of a seatback frame where holders are attached to the seatback frame.

Furthermore, as shown in FIG. 4, the top plate 20 has a flange 40 that extends toward the back side. The flange 40 has a groove 41 formed in the inner side (which is the lower side in FIG. 4) of the flange so that an edge of the seat cover 13 is put into the groove and fixed therein. This will be described in more detail later. Similarly, each side plate 21 has a flange 40 that extends toward the back side, and such flange 40 also has a groove 41 formed in the inner side of the flange 40, as illustrated in FIGS. 1-3. The flange 40 and the groove 41 of the top plate 20 respectively continue to the flange 40 and the groove 41 of each side plate 21.

As illustrated in FIGS. 1-4, the holders 12 each have, for example, a cylindrical shape made of a resin, and each holder 12 has a head 60 having a larger diameter and a body 61 extending downward from the head 60 and having a smaller diameter than the head 60. A through-hole 62 is formed through the head 60 and the body 61 along the axis of the holder 12 so that a stay 11a of the headrest 11 can be inserted into the through-hole 62.

As shown in FIG. 4, a first locking part 70 is formed at an end portion of the body 61 and the first locking part 70 acts as a stop that can be engaged with and stopped at the fixation hole 31. The body 61 has, at least around the end portion, flexibility in the radial direction. The first locking part 70 has an enlarged-diameter part 70a with a diameter gradually increasing upward from the bottom end, and a flanged part 70b formed at the upper end of the enlarged-diameter part 70a. When the holder 12 is inserted through the insertion hole 30 of the top plate 20, the enlarged-diameter part 70a of the first locking part 70 comes into contact with the side wall of the fixation hole 31 and deforms inwardly. When the enlarged-diameter part 70a moves further and passes through the fixation hole 31, the deformed enlarged-diameter part 70a returns to the normal state and the flanged part 70b is stopped at the side wall of the fixation hole 31. In this way, the first locking part 70 is engaged with and stopped at the fixation hole 31. Such first locking part 70 can be easily removed from the fixation hole 31 by pulling up the holder 12 while allowing the enlarged-diameter part 70a to deform inwardly.

A second locking part 71 is provided at an upper portion of the body 61, and the second locking part 71 can be engaged with and stopped at the insertion hole 30. The second locking part 71 is formed as a flanged portion having a larger diameter than that of the insertion hole 30. When the holder 12 is inserted into the insertion hole 30, the second locking part 71 is stopped at the side wall of the insertion hole 30 so that the holder 12 does not move any further into the hole. It should be noted here that the second locking part 71 is configured so as to be engaged with and stopped at the insertion hole 30 when the first locking part 70 is engaged with and stopped at the fixation hole 31.

The dimensions of the holder 12 are designed so that, when the second locking part 71 is engaged with and stopped at the insertion hole 30 and the first locking part 70 is engaged with and stopped at the fixation hole 31, the top plate 20 and the head 60 have a space therebetween to enable the seat cover 13 to be placed in the space.

As illustrated in FIG. 1, the seat cover 13 covers the front side of the seatback frame 10. The seat cover 13 has a thick seat pad 80 made of urethane or the like, and a seat surface 81 that covers the surface of the seat pad 80. For example, a fastener 82 for fixing the seat cover 13 to the seatback frame 10 is provided at the peripheral edge of the seat surface 81. By fitting the fastener 82 in the grooves 41 formed at the inner side of the top plate 20 and the side plates 21, the seat cover 13 can be fixed to the seatback frame 10. Furthermore, a through-hole 83 for inserting the holder 12 therethrough is formed at an upper portion of the seat cover 13. The through-hole 83 is formed at a position that corresponds to the position of the insertion hole 30 of the top plate 20 when the seat cover 13 is attached to the seatback frame 10.

As shown in FIG. 1, the seat cover support 14 is provided at an inner side of the front side of the seatback frame 10 and supports the seat cover 13 from the back side.

Figure 5:
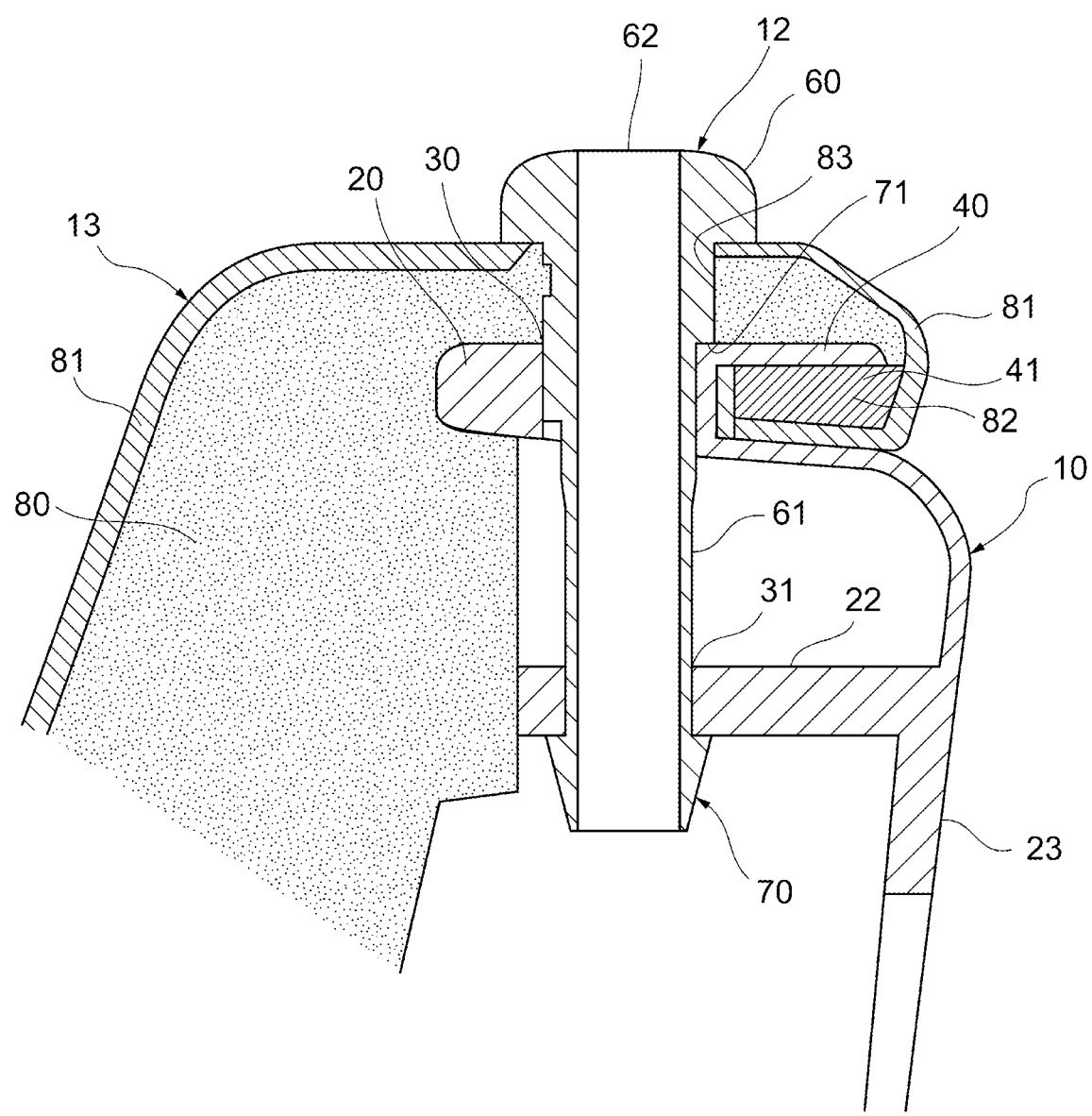
FIG. 5 is an enlarged cross-sectional view of a portion of a seatback frame where holders are attached to the seatback frame with a seat cover placed over the seatback frame.

According to the seat structure 1 having the above-described configuration, the seat cover 13 is attached to the seatback frame 10 as illustrated in FIG. 5. In this attachment, the fastener 82 is inserted into the grooves 41 so that the seat cover 13 is fixed to the seatback frame 10. While the seat cover 13 covers the front side of the seatback frame 10, the back side (back plate 23) of the seatback frame 10 is exposed.

When the two holders 12 are inserted from above the seat cover 13 through the through-holes 83 of the seat cover 13, through the insertion holes 30 of the top plate 20 of the seatback frame 10, and through the fixation holes 31 of the fixing plate 22 of the seatback frame 10, the first locking part 70 provided at an end portion of each holder 12 is fixed in the fixation hole 31 and the second locking part 71 of the holder 12 is engaged with and stopped at the insertion hole 30.

Figure 6:
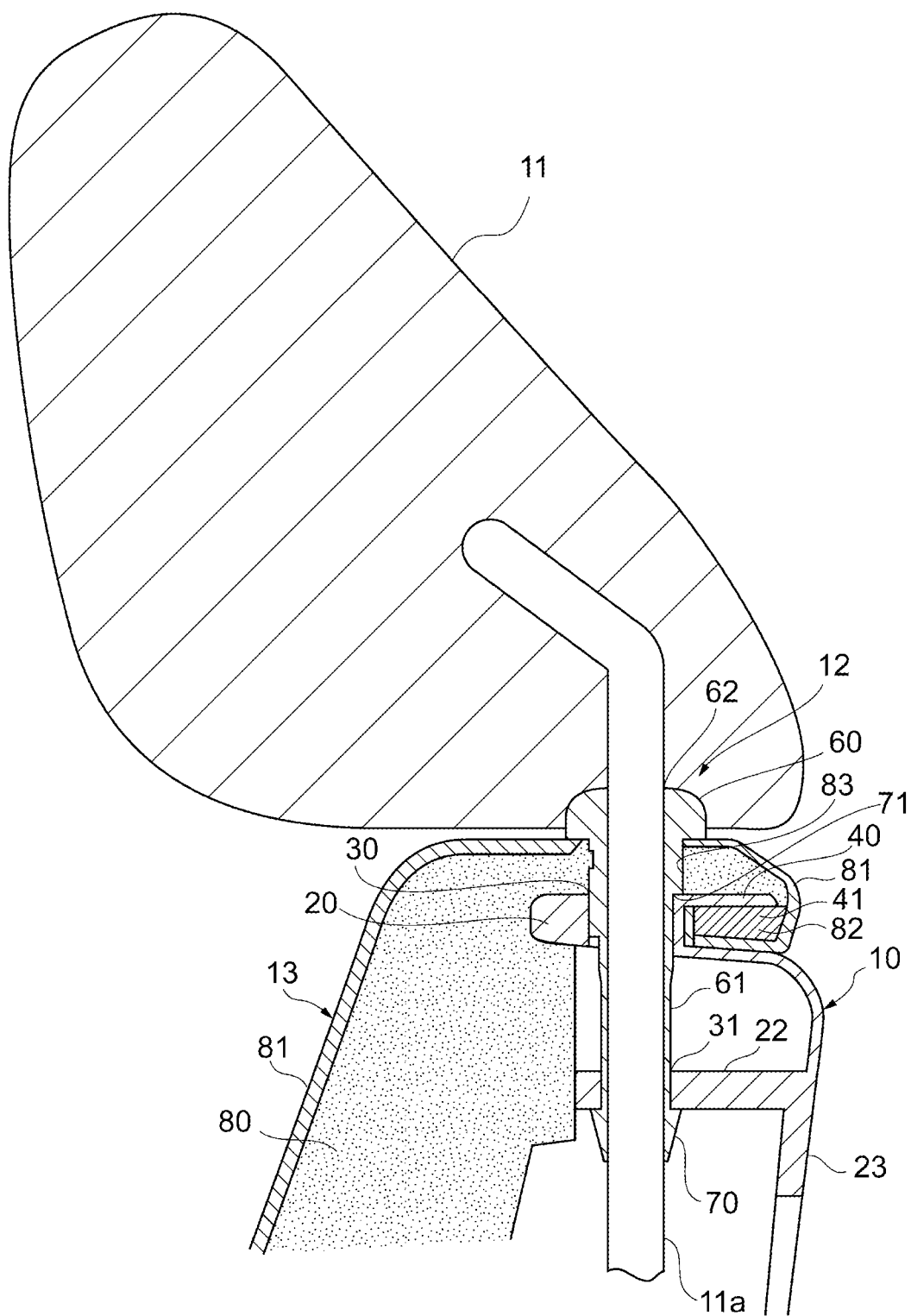
FIG. 6 is an enlarged cross-sectional view of a portion of a seatback frame where holders are attached to the seatback frame with a headrest attached to the seatback frame.

Next, as shown in FIG. 6, the stay 11a of the headrest 11 is inserted into the through-hole 62 of the holder 12, so that the headrest 11 is fixed to the seatback frame 10. In this state, the stay 11a of the headrest 11 is contained in a space forward of the back plate 23 of the seatback frame 10, i.e., the stay 11a is not exposed on the back side of the back plate 23.

According to the present embodiment, the holders 12 are removable from the seatback frame 10 and this enables easy replacement of the holders 12. Moreover, the seatback frame 10 has the top plate 20 extending from the upper portion of the back plate 23 toward the front side and the fixing plate 22 arranged below the top plate 20 and extending from the back plate 23 toward the front side. The top plate 20 has two insertion holes 30 into which two holders 12 can be inserted from above, and the fixing plate 22 is configured so as to be able to fix the end portions of the two holders 12 inserted through the insertion holes 30. With this configuration, each holder 12 is attached at a position forward of the back plate 23 so that the stay 11a of the headrest 11 does not project backward of the back plate 23. Accordingly, it is only necessary to provide the seat cover 13 over the front side of the seatback frame 10, and, as a result, the weight of the seat cover 13 can be reduced, resulting in a seat which is lighter in weight. In addition, since the holders 12 are attached to the top plate 20 and the fixing plate 22, both of which are extending from the back plate 23, sufficient strength of attachment between the headrest 11 and the seatback frame 10 can be attained.

The fixing plate 22 is formed so as to extend from one of the right and left side plates 21 to the other, i.e., the fixing plate 22 has a bridging structure, and this enhances the strength of the seatback frame 10. Thus, when an external force is applied to the seat in a rearward manner, inward bending of the seat (a phenomenon in which the right and left sides of the seatback frame bend inwardly forward) can be suppressed.

The top plate 20 and the side plates 21 each have the flange 40 extending toward the back side, and the groove 41 is formed inside the flange 40 for inserting and fixing an edge of the seat cover 13 therein. Accordingly, the seat cover 13 can be easily attached and detached with a simple configuration.

Preferred embodiments of the present invention have been described above with reference to the attached drawings; however, the present invention is not limited to the described examples. A person skilled in the art could obviously think of various modifications and alterations without departing from the idea specified in the claims, and it should be appreciated that such modifications and alterations would obviously fall within the technical scope of the present invention.

For example, the number of the holders 12, the insertion holes 30, and the fixation holes 31 mentioned in the above embodiment may be selected as appropriate, and such number may be one or may be three or more. The respective shapes and structures of the holder 12, the seatback frame 10, the headrest 11, the seat cover 13, etc., are not limited to those described in the above embodiment. For example, the fixing plate 22 may be formed so as not to reach the right and left side plates 21. Further, the manner of fixation between the holder 12 and the fixing plate 22 is not limited to the fixation manner described in the above embodiment.

INDUSTRIAL APPLICABILITY

The present invention is useful for providing a seat structure that enables easy replacement of holders, reduces the weight of a seat cover to accordingly reduce the weight of the seat, and ensures sufficient strength of attachment between a headrest and a seatback frame.

REFERENCE SIGNS LIST

1. SEAT STRUCTURE
10. SEATBACK FRAME
11. HEADREST
12. HOLDER
13. SEAT COVER
20. TOP PLATE
21. SIDE PLATE
22. FIXING PLATE
23. BACK PLATE
30. INSERTION HOLE
31. FIXATION HOLE

What is claimed is:

1. A seat structure enabling a headrest to be fixed to a seatback frame made of a resin via a holder, wherein:
    the holder is removable from the seatback frame;
    the seatback frame has a back plate, a top plate extending from an upper portion of the back plate toward a front side, and a fixing plate provided below the top plate and extending from the back plate toward the front side;
    the top plate has an insertion hole into which the holder can be inserted from above;
    the fixing plate is configured so as to be able to fix an end portion of the holder that is inserted through the insertion hole of the top plate;
    the holder has a hole into which a stay of the headrest is inserted;
    the holder has a body and a head, the head having a larger diameter than the body;
    the body has a first locking part that can be engaged with and stopped at the fixing plate and a second locking part that can be engaged with and stopped at the top plate;
    the holder is configured so that, when the first locking part is engaged with and stopped at the fixing plate and the second locking part is engaged with and stopped at the top plate, the top plate and the head have a space therebetween to enable a seat cover to be placed in the space;
    the seatback frame has side plates extending from right and left sides of the back plate toward the front side;
    the top plate and the side plates each have a flange extending toward a back side; and
    the flange has a groove formed at an inner side of the flange so that an edge of a seat cover is inserted into the groove and fixed therein.
2. The seat structure according to claim 1, wherein the fixing plate is formed so as to extend from one of the right and left side plates to the other.
3. The seat structure according to claim 1, the hole of the holder penetrates a central axis of the head and the body.

* * * * *